United States Patent
Ogiri et al.

(10) Patent No.: US 9,399,598 B2
(45) Date of Patent: Jul. 26, 2016

(54) METHOD FOR REMOVAL OF RADIOACTIVE CESIUM AND FACILITY THEREFOR

(71) Applicant: TAIHEIYO CEMENT CORPORATION, Minato-Ku (JP)

(72) Inventors: Tetsuo Ogiri, Minato-Ku (JP); Souichirou Okamura, Minato-Ku (JP); Kenichi Honma, Chiba (JP)

(73) Assignee: Taiheiyo Cement Corporation, Tokyo (JP)

( * ) Notice: Subject to any disclaimer, the term of this patent is extended or adjusted under 35 U.S.C. 154(b) by 110 days.

(21) Appl. No.: 14/357,519

(22) PCT Filed: Oct. 30, 2012

(86) PCT No.: PCT/JP2012/077968
§ 371 (c)(1),
(2) Date: May 9, 2014

(87) PCT Pub. No.: WO2013/073361
PCT Pub. Date: May 23, 2013

(65) Prior Publication Data
US 2014/0343342 A1 Nov. 20, 2014

(30) Foreign Application Priority Data

Nov. 18, 2011 (JP) .................................. 2011-252432

(51) Int. Cl.
*G21F 9/32* (2006.01)
*C04B 7/44* (2006.01)
(Continued)

(52) U.S. Cl.
CPC ................. *C04B 7/4423* (2013.01); *C04B 7/43* (2013.01); *C04B 28/10* (2013.01); *F23J 1/02* (2013.01);
(Continued)

(58) Field of Classification Search
None
See application file for complete search history.

(56) References Cited

U.S. PATENT DOCUMENTS 3,018,161 A * 1/1962 Erlebach ................ C01D 17/00
423/210
3,979,498 A * 9/1976 Campbell ............ C01G 55/002
205/498

(Continued)

FOREIGN PATENT DOCUMENTS

FR 2766954 * 7/1997
JP 6331587 2/1988
(Continued)

OTHER PUBLICATIONS

European Search Report for Application No. EP12850605. Issued Jun. 26, 2015.
(Continued)

*Primary Examiner* — Melvin C Mayes
*Assistant Examiner* — Sheng H Davis
(74) *Attorney, Agent, or Firm* — Stetina Brunda Garred & Brucker

(57) ABSTRACT

To provide a method and an apparatus for removing radioactive cesium from waste containing radioactive cesium at low cost. A radioactive cesium removal apparatus 1 including: an incinerator 22 for burning an inflammable waste polluted with radioactive cesium; a suspension preheater 23 for, with the combustion exhaust gas G5 and a sensible heat of the incineration ash of a combustible C discharged from the incinerator, generating calcium oxide or/and magnesium oxide from a source of calcium oxide or/and a source of magnesium oxide, cyclones of the suspension preheater being arranged in multistages; a rotary kiln 21 for burning an inorganic substance S polluted with radioactive cesium together with the calcium oxide or/and the magnesium oxide and the incineration ash D3 including the radioactive cesium; and collectors 31, 32 for collecting cesium volatilized in the rotary kiln.

4 Claims, 1 Drawing Sheet

(51) Int. Cl.
*G21F 9/02* (2006.01)
*F23J 1/02* (2006.01)
*F23J 15/02* (2006.01)
*C04B 28/10* (2006.01)
*C04B 7/43* (2006.01)
*C04B 111/00* (2006.01)

(52) U.S. Cl.
CPC . *F23J 15/02* (2013.01); *G21F 9/02* (2013.01); *G21F 9/32* (2013.01); *C04B 2111/00767* (2013.01); *F23J 2219/30* (2013.01); *F23J 2900/01007* (2013.01); *Y02P 40/121* (2015.11); *Y02P 40/126* (2015.11); *Y02W 30/91* (2015.05); *Y02W 30/92* (2015.05)

(56) References Cited

U.S. PATENT DOCUMENTS

| | | | | |
|---|---|---|---|---|
| 4,156,394 A * | 5/1979 | Mallek | .................. | C10B 1/04 110/208 |
| 5,193,997 A * | 3/1993 | Aoyama | .............. | F27B 15/003 432/106 |
| 5,335,609 A * | 8/1994 | Nelson | .................... | F23G 5/006 110/204 |
| 5,662,050 A * | 9/1997 | Angelo, II | ............. | B01D 53/74 110/246 |
| 5,732,365 A * | 3/1998 | Howard | .................. | C03B 5/005 501/155 |
| 6,502,520 B1 * | 1/2003 | Nishi | ...................... | F23G 5/085 110/211 |
| 7,033,417 B1 * | 4/2006 | Patzelt | ................ | C21B 13/0033 75/444 |
| 2004/0253157 A1 * | 12/2004 | Bakke | ..................... | C01B 17/96 423/193 |
| 2004/0265202 A1 * | 12/2004 | Chandran | ................ | A62D 3/37 423/239.1 |

FOREIGN PATENT DOCUMENTS

| | | |
|---|---|---|
| JP | 206487 | 8/1995 |
| JP | 7206487 | 8/1995 |
| JP | 227184 | 9/1997 |
| JP | 9227184 | 9/1997 |
| JP | 200395712 | 4/2003 |
| JP | 2003095712 | 4/2003 |
| JP | 201150951 | 3/2011 |
| WO | 2010112732 | 10/2010 |
| WO | WO2010112732 | 10/2010 |

OTHER PUBLICATIONS

Japanese Patent Office, International Search Report, Application No. PCTJP2012077968, Jan. 24, 2013, 2 Pages.

* cited by examiner

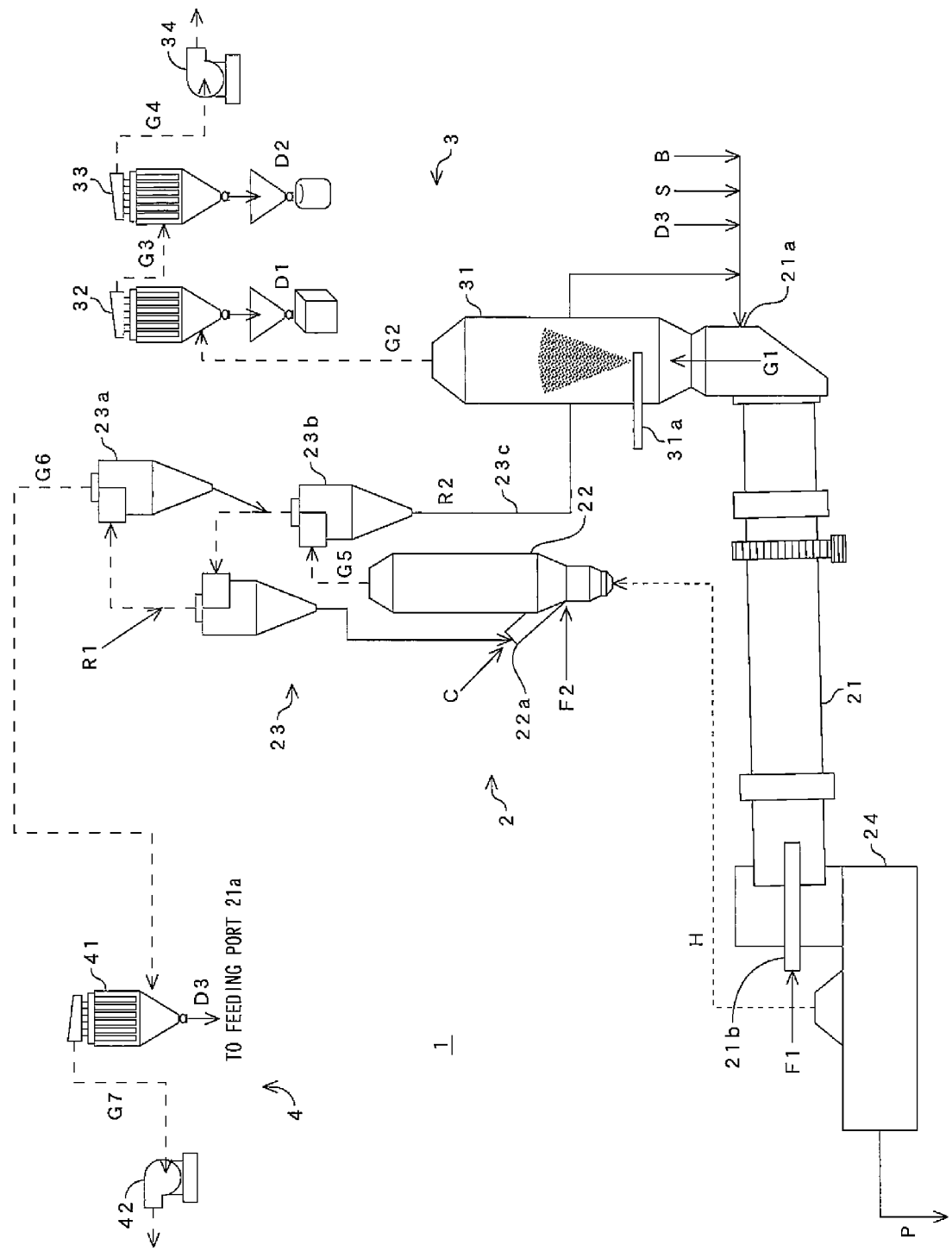

US 9,399,598 B2

METHOD FOR REMOVAL OF RADIOACTIVE CESIUM AND FACILITY THEREFOR

CROSS-REFERENCE TO RELATED APPLICATIONS

The present application claims priority to International Application No. PCT/JP2012/077968 filed on Oct. 30, 2012, which claims priority to Japanese Patent Application No. 2011-252432 filed Nov. 18, 2011.

STATEMENT RE: FEDERALLY SPONSORED RESEARCH/DEVELOPMENT

Not Applicable

BACKGROUND OF THE INVENTION

1. Technical Field of the Invention

The present invention relates to a method and an apparatus for removing radioactive cesium from waste containing radioactive cesium and effectively utilizing obtained burned product after the decontamination as cement additives after ground and as construction materials consisting of this burned product, etc.

2. Description of the Related Art

A variety of proposals have been made on means and apparatus for decontaminating radioactive material from waste containing radioactive material such as radioactive cesium. For example, in the patent document 1 is disclosed a method of melting radioactive waste produced by nuclear fission that exists in a form of nitrate thorough electromagnetic induction heating in a cooling container with slits and a turning-on-electricity coil wounded on the outside of the container; volatilizing long-lived nuclides such as cesium; and separating and collecting the volatilized long-lived nuclides.

Japanese Patent Publication No. Heisei 5-157897 gazette

However, an issue that is produced in our country according to the accident of the nuclear power plant of this time and that should be solved is not carrying out decontamination of a waste generated by usual operation in nuclear related facilities, which is described in the above-mentioned patent document 1, but carrying out decontamination of radioactive materials that were emitted to the external world and incorporated into trees, soil, etc. Since attaining to a huge quantity of such radioactive waste is expected, it is especially important—to offer, not a proposal of a mere decontamination means, but a means for efficiently carrying out volatilization removal and collection of radioactive materials in large quantities to reduce costs for the processes.

If the waste containing radioactive materials is thrown and heated together with limestone into burning devices such as a kiln, it is possible to volatilize the radioactive materials and obtain a decontaminated product, but with conventional methods of heating waste only with burning devices as a kiln, energy for decarboxylation becomes necessary since limestone is mixed as it is, and it is expected that much energy is wasted. Then, when preheating devices such as a preheater were used and decarboxylation of limestone was performed to effectively use waste heat, radioactive cesium volatilized from a burning device became a solid; it returned to the burning device again; and circulation concentration was carried out, so that there was a possibility that a product, which should be decontaminated, might not certainly be decontaminated.

Therefore, this invention has been made in view of the above-mentioned problems to be solved, and the object thereof is to provide a method and an apparatus for certainly removing radioactive cesium from waste containing radioactive cesium with lower energy consumption.

BRIEF SUMMARY OF THE INVENTION

In order to attain the above-mentioned object, this invention relates to a radioactive cesium removal method, and the method is characterized by comprising the steps of: burning an inflammable waste polluted with radioactive cesium; with the combustion exhaust gas and a sensible heat of the incineration ash, generating calcium oxide or/and magnesium oxide from a source of calcium oxide or/and a source of magnesium oxide, and collecting the incineration ash including the radioactive cesium from the combustion exhaust gas; burning the calcium oxide or/and the magnesium oxide, the recovered incineration ash including the radioactive cesium and an inorganic substance polluted with radioactive cesium; and collecting the radioactive cesium volatilizing in the burning by cooling an exhaust gas discharged from the burning process to obtain a decontaminated product.

Then, with the present invention, it is possible to burn an inflammable waste polluted with radioactive cesium and volatilize the radioactive cesium from the waste or allow the radioactive cesium to be concentrated in the incineration ash, in addition, obtained decontaminated product can effectively be utilized as cement additives after ground and as construction materials consisting of the burned product, etc., which allows radioactive cesium to effectively be removed at low cost.

In the radioactive cesium removal method, a heat generated at the cooling of the decontaminated product can be used as at least a part of a heat source in the combustion of the inflammable waste polluted with radioactive cesium.

In the radioactive cesium removal method, when the inorganic substance polluted with radioactive cesium is burned with the calcium oxide or/and the magnesium oxide and the incineration ash, an equivalent amount of chlorine source more than or equal to a total amount of cesium included in the calcium oxide or/and magnesium oxide, the incineration ash and the inorganic substance is added. With this, cesium can be efficiently volatilized as cesium chloride.

Moreover, the present invention relates to a radioactive cesium removal apparatus, and the apparatus is characterized by comprising: an incinerator for burning an inflammable waste polluted with radioactive cesium; a suspension preheater for, with the combustion exhaust gas and a sensible heat of the incineration ash of the inflammable waste discharged from the incinerator, generating calcium oxide or/and magnesium oxide from a source of calcium oxide or/and a source of magnesium oxide, cyclones of the suspension preheater being arranged in multistages; a dust collector for collecting the incineration ash including the radioactive cesium from the combustion exhaust gas discharged from the incinerator; a rotary kiln for burning an inorganic substance polluted with radioactive cesium together with the calcium oxide or/and the magnesium oxide and the recovered incineration ash including the radioactive cesium; and a collector for cooling an exhaust gas, which includes volatilized radioactive cesium, discharged from the rotary kiln to collect cesium.

With the present invention, in the incinerator is burned an inflammable waste polluted with radioactive cesium; in the suspension preheater, with the combustion exhaust gas and a sensible heat of the incineration ash discharged from the incinerator, calcium oxide or/and magnesium oxide is generated from a source of calcium oxide or/and a source of magnesium oxide; in the rotary kiln is burned an inorganic substance polluted with radioactive cesium together with the calcium oxide or/and the magnesium oxide and the recovered incineration ash including the radioactive cesium to obtain decontaminated product that can effectively be utilized as cement additives, construction materials and so on; and further with the collector is collected volatilized cesium to allow radioactive cesium to be removed from waste containing radioactive cesium. In addition, two kinds of combustion gases exhausted from a conventional incinerator for burning and incinerating inflammable waste and a rotary kiln for heating inorganic substance polluted with radioactive cesium are separately processed, so that radioactive cesium is certainly removed from decontaminated product and combustion heat of inflammable substance contained in the waste and heat generated at the cooling of the decontaminated product can effectively be utilized, resulting in waste decontamination with lower energy consumption and lower cost.

In the radioactive cesium removal apparatus, the incinerator can be fluidized bed type, fluidized layer type, spouted bed type or air current type.

Further, in the radioactive cesium removal apparatus, the calcium oxide or/and the magnesium oxide and the incineration ash discharged from the incinerator are fed from a chute connected to a raw material outlet portion of a lowest stage cyclone of the suspension preheater to the rotary kiln. Feeding the calcium oxide or/and the magnesium oxide and the incineration ash to the rotary kiln from the incinerator allows energy for decarboxylation to be decreased, resulting in decreased energy required for decontamination processing. In addition, directly feeding the calcium oxide or/and the magnesium oxide and the incineration ash is more preferable since sensible heat taken in the kiln increases.

In the above radioactive cesium removal apparatus, the collector may include a cooling tower for cooling the exhaust gas from the rotary kiln and a dust collector for collecting a dust in an exhaust gas from the cooling tower, which allows radioactive cesium to be collected.

As described above, with the present invention, radioactive cesium is removed from waste containing radioactive cesium, and waste after decontamination is utilized as cement additives and so on at low energy consumption, which allows radioactive cesium to efficiently be removed at low cost. In addition, radioactive waste can be disposed while reducing volume thereof.

BRIEF DESCRIPTION OF THE DRAWINGS

FIG. 1 is a schematic representation of the overall structure of a radioactive cesium removal apparatus according to an embodiment of the present invention.

DETAILED DESCRIPTION OF THE INVENTION

Next, an embodiment carrying out the present invention will be explained in detail with reference to FIG. 1. In the following explanation, with a radioactive cesium removal apparatus of the present invention, while removing radioactive cesium from a waste containing radioactive cesium, cement additives and construction materials are produced from decontaminated waste as an example. Here, radioactive cesium includes cesium 134 and the cesium 137 that are radioactive isotopes of cesium.

FIG. 1 shows a radioactive cesium removal apparatus according to an embodiment of the present invention, and the removal apparatus 1 is roughly divided and provided with a burning device 2, a decontamination system exhaust gas processing device 3, and a combustible incineration system exhaust gas processing device 4.

The burning device 2 is composed of a rotary kiln 21, an incinerator 22, a suspension preheater (hereinafter referred to as "preheater") 23 and a clinker cooler 24.

The rotary kiln 21 is equipped with a feeding port 21a for directly supplying a matter to be burned to the rotary kiln 21, and a burner 21b for injecting fossil fuel such as pulverized coal to burn the matter supplied into the rotary kiln 21.

The incinerator 22 is mounted to burn and incinerate a combustible C such as deforestation tree polluted with radioactive cesium, and is provided with a burner (not shown) for injecting fossil fuel such as pulverized coal, and a feeding port 22a for the combustible C. Into a bottom portion of the incinerator 22 is introduced a hot extracted gas H from the clinker cooler 24 as an air for combustion. For this incinerator 22 can be used a fluidized bed type, a fluidized layer type, a spouted bed type or an air current type incinerator.

In the preheater 23 are arranged cyclones over multistages; to a gas duct of a highest stage cyclone 23a is supplied a raw material R1 as a source of calcium oxide or/and a source of magnesium oxide; and a chute 23c connected to a raw material discharge portion of the lowest stage cyclone 23b is connected to the feeding port 21a of the rotary kiln 21.

The decontamination system exhaust gas processing device 3 is disposed in a rear stage of the burning device 2, and is provided with a cooling tower 31 for cooling an exhaust gas G1 exhausted from the rotary kiln 21, a first dust collector 32 and a second dust collector 33 that are disposed in a rear stage of the cooling tower 31, and a fan 34 for exhausting an exhaust gas G4 from which dusts such as cesium-concentrated salt are removed by the dust collectors 32, 33.

The cooling tower 31 is mounted to cool the exhaust gas G1 from the rotary kiln 21 and collect radioactive cesium and the like that are volatilized from the polluted waste in a solid state. The cooling of the exhaust gas G1 is carried out by spraying water from a water spray device 31a mounted at a lower end portion of the cooling tower 31. In this connection, it is sufficient that the water spray device 31a has a function to an extent that volatilized cesium chloride can be recovered in a solid state by adhering it to a dust contained in the exhaust gas G1, and the position that the water spray device 31a is installed is not limited to a lower end portion of the cooling tower 31. In addition, in place of cooling with water, cooling air may be introduced into the cooling tower for the cooling, the cooling with water and the cooling with air can separately be performed or the both may simultaneously be carried out.

The first dust collector 32 is installed to collect the dust D1 containing the condensed cesium salt and others as mentioned above, and a bag filter and so on are used.

The second dust collector 33 is installed to remove acid gases and others contained in the exhaust gas G3 after removing a cesium salt etc., and the dust D2 which adsorbs acid gases and others are collected. A bag filter or the like is used also for this second dust collector 33.

The combustible incineration system exhaust gas processing device 4 is provided to process the exhaust gas G6 that is exhausted from the highest stage cyclone 23a of the preheater 23 of the burning device 2, a dust collector 41 and a fan 42 in a rear stage of the dust collector 41 are installed. The dust collector 41 is installed to remove a dust D3 containing incineration ash included in the exhaust gas G6, and a bag filter and so on are used.

Next, the motion of the removal apparatus 1 with the above-mentioned construction will be explained with reference to FIG. 1.

While feeding the raw material R1 such as limestone powder (source of CaO) into the preheater 23 of the burning device 2, a combustible C such as a deforestation tree polluted with radioactive cesium is fed to the incinerator 22 together with the fuel F2 such as pulverized coal to carry out combustion incineration. Under the present circumstances, as described below, in order to use heat generated when cooling a decontaminated product, a gas H extracted from the clinker cooler 24 may be used as at least a part of the air for combustion.

The exhaust gas G5 from the incinerator 22 flows from the lowest stage cyclone 23b to the highest stage cyclone 23a of the preheater 23, and at this moment, with sensible heats of the exhaust gas G5 and the incineration ash contained in the exhaust gas G5, the raw material R1 fed into the preheater 23 is decarboxylated, and it decomposes into calcium oxide (CaO) and carbon dioxide (CO2).

Decarboxylated raw material R2 is supplied to the rotary kiln 21 from feeding port 21a through the lowest stage cyclone 23b and the chute 23c from the incinerator 22.

On the other hand, the exhaust gas G6 from the highest stage cyclone 23a of the preheater 23 is introduced to the dust collector 41, and after the dust D3 including an incineration ash of the combustible C, which is contained in the exhaust gas G6 is collected, a cleaned exhaust gas G7 is discharged by the fan 42 out of the system. The collected dust D3 is supplied to the feeding port 21a of the rotary kiln 21 together with the raw material R2.

Radioactive cesium contained in the combustible C volatilizes in the incinerator 22 or is discharged with incineration ash from the incinerator 22 without volatilization. Anyway, the radioactive cesium is supplied to the feeding port 21a of the rotary kiln 21 in a state where it was incorporated into the dust D3 or the raw material R2 with temperature decrease of the exhaust gas G5 in the preheater 23.

Into the rotary kiln 21, together with the above-mentioned raw material R2 and the dust D3 is fed an inorganic substance S such as a soil polluted with radioactive cesium from the feeding port 21a, and the raw material R2, the dust D3 and the inorganic substance S are burned. Moreover, in addition to the inorganic substance S, an equivalent amount of chlorine source more than or equal to a total amount of cesium in the rotary kiln 21 as a reaction accelerator B is fed from the feeding port 21a into the rotary kiln 21. As the chlorine source can be used calcium chloride (CaCl2), potassium chloride (KCl), sodium chloride (NaCl), waste plastics containing chlorine and so on, and CaCl2 is desirable since it will supply only chlorine without being volatilized.

The radioactive cesium that is contained in the inorganic substance S, the raw material R2 and the dust D3 react with chlorine produced from a source of chlorine in the rotary kiln 21 and turn into cesium chloride to volatilize, and are introduced, in a state where it is contained in the exhaust gas G1, to the cooling tower 31.

In the cooling tower 31, the exhaust gas G1 is rapidly cooled with water (or cooling air introduced in the cooling tower or these mixtures) sprayed from the watering equipment 31a, and the cesium chloride contained in the exhaust gas G1 becomes cesium salt in a solid state, and adheres to the dust.

The exhaust gas G2 containing a cesium salt from the cooling tower 31 is introduced into the first dust collector 32, and the dust D1 containing a solid-like concentration cesium salt is collected. From the collected dust D1, after taking volume reduction measures further by flushing, adsorption, etc. if needed, it can be sealed and kept in containers made of concrete etc., which allows the waste containing radioactive cesium to be reduced in its volume and stored without being leaked outside.

On the other hand, when harmful gas such as acid gas is contained in the exhaust gas G3 after collecting concentrated cesium salts, with the second dust collector 33 can be collected the dust D2 that adsorbs the acid gas contained in the exhaust gas G3 after removing cesium salts etc., and the cleaned exhaust gas G4 can be exhausted out of the system through the fan 34.

On the other hand, the inorganic substance S, the raw material R2 and the dust D3 fed into the rotary kiln 21 are burned after radioactive cesium is removed through volatilization with combustion heat of the pulverized coal that is blown from the burner 21b in the rotary kiln 21, and it is cooled by the clinker cooler 24, and clinker (decontaminated product) P that can be used as cement additives, construction materials, etc. is generated. A gas H extracted from the clinker cooler has heat produced in the cooling, so that the extracted gas H can be introduced to the burning device 2 so as to be used as a part of heat source of the burning in the burning device 2.

As mentioned above, with the present embodiment, while decontaminating radioactive cesium from the waste (the combustible C, the inorganic substance S) containing radioactive cesium, the waste after decontamination can be used as a fuel and a raw material to produce cement additives etc. as a decontaminated product, which makes it possible to remove radioactive cesium at low cost.

In addition, in the above-mentioned embodiment, although the raw material R2, the dust D3, the inorganic substance S and the reaction accelerator B are supplied into the rotary kiln 21 from the feeding port 21a, each of them may directly be supplied to the rotary kiln 21, or each of them can be mixed with each other before supplying to the rotary kiln 21. When it is difficult to handle the waste due to much water content or the like, quality of the waste can be improved by mixing the raw material R2 in advance.

Moreover, although deforestation tree and soil that are polluted with radioactive cesium are exemplified as waste polluted with radioactive cesium in the above embodiment, besides these, city garbage incineration ashes, melted slag derived from garbage, sewage sludge, sewage sludge dried matter, water-purifying sludge, construction sludge, sewage slag, shell, straw, grass, cow dung compost, bark, plants, rubble and so on, that is, all the wastes containing radioactive cesium can be targeted, and one selected from the group can be used independently or two or more of them can be used simultaneously. Furthermore, intermediate processed matter with condensed radioactive cesium that is obtained by removing beforehand a part (sand and stone for soil) is also included in the waste polluted with radioactive cesium in this invention.

Furthermore, in the above embodiment, although raw materials for cement additives such as limestone powder is exemplified as a source of CaO, material containing calcium carbonate, quicklime, slaked lime, limestone, dolomite, blast furnace slag and so on may be used as a source of CaO. Also, other than the cement additives, only aggregates and CaO may be produced.

Moreover, in place of CaO source, or together with CaO source, MgO source can be used to produce MgO or MgO and CaO, in this case as a source of MgO, material containing magnesium carbonate, magnesium hydroxide, dolomite, serpentine, ferronickel alloy slag and so on may be used, and one selected from the group can be used independently, or two or more of them can be used simultaneously. Further, these sources of CaO and MgO can be adjusted to a moderate particle size, and can be used as a bed material of incinerators (of fluidized bed type, or a fluidized layer type).

Burning the waste (inorganic substance such as incineration ash of inflammable waste or/and soil) containing radioactive cesium with CaO or/and MgO allows basicity of a burned material to be raised and can suppress generation of liquid phase in a burning process. With this, radioactive cesium can efficiently be volatilized.

Although in the above embodiment is explained a radioactive cesium removal apparatus with a burning device that is composed of a rotary kiln, a fluidized bed type, fluidized layer type, jet layer type, or air current-type incinerator, a preheater, and a clinker cooler, the radioactive cesium removal apparatus of the present invention is not limited to those with the above burning device, but a radioactive cesium removal apparatus with a batch type incinerator as a burning device may be used, and other apparatus construction may be adopted as long as it is possible to heat the waste polluted with radioactive cesium with the source of CaO or/and the source of MgO and volatilize radioactive cesium from the polluted waste to generate CaO or/and MgO.

Moreover, although the dust D1 containing a solid-like concentrated cesium salt is collected with the first dust collector 32 of the decontamination system exhaust gas processing device 3, it is possible to collect the solid-like concentration cesium salt using a scrubber etc.

DESCRIPTION OF THE REFERENCE NUMBERS 1 radioactive cesium removal apparatus
2 burning device
21 rotary kiln
21a feeding port
21b burner
22 incinerator
22a feeding port
23 suspension preheater
23a highest stage cyclone
23b lowest stage cyclone
23c chute
24 clinker cooler
3 decontamination system exhaust gas processing unit
31 cooling tower
31a water spray device
32 first dust collector
33 second dust collector
34 fan
4 combustible incineration system exhaust gas processing unit
41 dust collector
42 fan
B reaction accelerator (chlorine source)
C combustible (polluted with radioactive cesium)
D1-D3 dusts
F1, F2 fuels
G1-G7 exhaust gases
H extracted gas (from cooler)
R1, R2 raw materials (for cement additives)
P clinker (decontaminated product)
S inorganic substance (polluted with radioactive cesium)

The invention claimed is:

1. A radioactive cesium removal method comprising the steps of:
    (a) burning an inflammable waste polluted with radioactive cesium to produce a combustion exhaust gas and an incineration ash including the radioactive cesium;
    (b) generating calcium oxide or/and magnesium oxide from a source of calcium oxide or/and a source or magnesium oxide using a sensible heat associated with both of the combustion exhaust gas and the incineration ash of the inflammable waste;
    (c) collecting the incineration ash including the radioactive cesium from the combustion exhaust gas;
    (d) combining said calcium oxide or/and said magnesium oxide, the recovered incineration ash including the radioactive cesium, and an organic substance polluted with radioactive cesium;
    (e) burning said calcium oxide or/and said magnesium oxide, the recovered incineration ash including the radioactive cesium, and an organic substance polluted with radioactive cesium; and
    (f) collecting a radioactive cesium volatized during said burning in step (e) by cooling an exhaust gas discharged from the burning in step (e) to obtain a decontaminated product.

2. The radioactive cesium removal method as claimed in claim 1, wherein a heat generated during cooling in step (f) is used as at least a part of a heat source in the combustion of the inflammable waste polluted with radioactive cesium.

3. The radioactive cesium removal method as claimed in claim 1, wherein when the inorganic substance polluted with radioactive cesium is burned with the calcium oxide or/and the magnesium oxide and the incineration ash in step (e), an equivalent amount of chlorine source more than or equal to a total amount of cesium included in the calcium oxide or/and magnesium oxide, the incineration ash and the inorganic substance is added.

4. The radioactive cesium removal method as claimed in claim 2 wherein when the inorganic substance polluted with radioactive cesium is burned with the calcium oxide or/and the magnesium oxide and the incineration ash in step (e), an equivalent amount of chlorine source more than or equal to a total amount of cesium included in the calcium oxide or/and magnesium oxide, the incineration ash and the inorganic substance is added.

* * * * *